3,264,138
DE-SCALING PROCESS
Carl I. Messelt, Pebble Beach, Calif., assignor to Scale Down, Inc., Los Angeles, Calif., a corporation of California
No Drawing. Filed Oct. 8, 1964, Ser. No. 402,620
4 Claims. (Cl. 134—2)

This invention relates generally to the prevention of scale formation and to the elimination of existing scale in equipment containing flowing water. More specifically, this invention relates to the prevention, and elimination, of scale in metallic equipment employing evaporation of water, such as in evaporative air-coolers or evaporative air-conditioners.

In conventional gas or air-cooling systems, water is continuously circulated into heat transfer relationship with warmer gas or air. Part of this water evaporates and cools the gas or air in heat-transfer relationship with it. That part of the water which does not evaporate is generally recirculated to again enter into a heat-transfer relationship with warmer gas or air. As water is recirculated through the cooling system, the salts in the water are concentrated due to its evaporation of water. The effect is to continuously increase the concentration of these dissolved salts to the point where some of these salts are precipitated out onto the metallic surfaces of the cooling unit. These precipitated salts are generally referred to as scale and will be so referred to herein.

Many contemporary air-conditioning systems include pumps, condensers and standard heat exchangers. The formation of scale is particularly deleterious to the efficient operation of this equipment. Scale deposited within piping increases the resistance to fluid flow, thereby forcing pumps to work harder to maintain the same flow rates and may cause pump damage when line pressures rise to a point exceeding pump design. Scale, being a very poor heat conductor, is a major cause of inefficient operation of condensers and other heat exchangers, and, in fact, is directly responsible, in many instances, for an over-design of these units.

The problem of scaling has usually been approached by inhibiting the production of scale and/or attacking the scale directly. The former method requires the use of inhibitors such as the polyphosphates. This method requires the mixing of a number of components in order to tailor the resultant combination to the particular water. In addition, the polyphosphate method usually involves extensive water bleed-off and pH control through liquid acid addition. The method of direct attack consists of adding liquid acid to the equipment, such as sulphuric or muriatic acid. This method suffers from the difficult handling problems associated with strong acids, from attack of metallic parts, and from the requirement of constant pH adjustments.

In view of the foregoing facts, it is a major object of the present invention to provide a relatively inexpensive and simplified process wherein the deposition of scale in water-carrying systems is substantially reduced.

It is another object of the invention to provide a process which substantially eliminates scale from the metallic surfaces in evaporative cooling systems while substantially reducing the need for water bleed-off.

Further objects and advantages of my process will become clearly understood by referring to the following description and examples of use of the invention under actual plant operating conditions.

In general, my invention comprises the addition of a water-soluble iodide and a substance capable of yielding chloride ion in slightly alkaline, or neutral, aqueous media.

More specifically, my process comprises the addition of potassium iodide and dichlorodimethyl hydantoin to the circulating water. Examples of water-soluble iodides are those such as the alkali metals, e.g., sodium iodide, and the organic hydroiodides, e.g., glycine hydroiodide. Similarly, other chlorinated compounds which yield chloride ions in aqueous solution may be used. For example, chloroamines such as chlorine derivatives of cyanuric and isocyanuric acid, e.g., trichloromelamine and trichloroisocyanuric acid and inorganic chlorinating agents, such as sodium hypochlorite, are available sources of chloride ion.

Prior use of the combination of water-soluble iodide and chloride or a chlorine-yielding compound has been restricted to extremely low concentrations of iodide—generally less than 1.0 part per million. This limitation existed because the prior art was oriented towards the destruction and control of organisms in swimming pool water. The swimming pool environment required clear and nearly colorless water. The human factor also demanded a low concentration of chlorine, i.e., the molar ratio of available chlorine to available iodine had to be kept as low as possible consistent with proper iodine activity. This ratio was substantially less than 6:1. Furthermore, pH had to be controlled within relatively narrow limits, usually 7.2 to 8.0. From the description of my invention, below, it will become evident that the use of my invention and the results of that use are totally dissimilar to prior art teachings because I am operating in concentrations and ratios which would be totally unacceptable for purification purposes. Conversely, the low iodide concentrations of the purification art have been found to have no appreciable descaling effect.

In practicing the invention, it has been determined that the best addition procedure requires an approximately ten minute waiting period after the addition of the iodide compound before the chlorine compound is added to the water. Accurate metering methods are not required because the components of my invention are not sufficiently strong, i.e., corrosive, to cause any appreciable damage to equipment if an excess is added.

The amounts of each component to be added and the number of additions per week depend upon the characteristics of the evaporative system to be treated. These characteristics are determined by, for example, the hardness of the replacement water and the ratio of the number of gallons of water evaporated to the total water capacity of the system.

Tests conducted under actual plant operating conditions indicate that the ideal initial iodine concentration is approximately 10 parts per million and that a minimum initial iodine concentration exists near 5 parts per million. These tests also indicate that an initial molar ratio of available chlorine to available iodine in excess of about 6:1 should be used.

The upper limit of the iodine concentration is mainly determined by economic consideration. Concentration as high as 200 parts per million can be used without any damage to the equipment, but there would not appear to be any reason for using such a high concentration in view of the fact that the lower concentration will do the job.

The component concentration limits noted above result solely from pragmatic tests. No data based upon stoichiometric relationships can be given because, to the best of my knowledge, all attempts to discover the mechanisms of my invention have failed. Apparently, scale is loosened from the metallic surfaces to which it adheres by means of the action of the combination of components aforedescribed. Scale is thus stripped off in long pieces which can be observed to drop away from the metal leaving the latter substantially clean.

Scale which has been removed from the equipment surfaces is retained in suspension by the movement of water in the evaporative system. The suspended particles of scale remain in solution until the particle concentration reaches a point at which it redeposits onto equipment walls faster than it can be removed. Before this point is reached the equipment should be purged of all water. The length of time allowable before purging is required is at the discretion of the operator of each evaporative system. It has been found that ten weeks is not an unusually long time, even when no bleed-off exists. Of course, if part of the circulating water is bled off, the necessity for purging is proportionately delayed.

The circulating water tends to be dark green in color due to the relatively large amounts of chlorine and iodine and due to the increasing amounts of suspended scale particles. The pH of this water usually rises to a limiting value near 8.6 without the addition of any acids. This appears to be true even though the pH of the replacement water may reach a value of 8.2.

The operation of my invention may be better understood by reference to the following example:

An evaporative-cooling unit containing 2000 gallons of circulating water was chosen for test purposes because its highly scale-encrusted condition provided an excellent, although severe, test of my invention. Approximately 600 gallons of water were evaporated per 24-hour period throughout the test which lasted for approximately 10 weeks. No water bleed-off was allowed in this period during which the cooling unit was used to cool the air in a substantial portion of a large Los Angeles hotel.

Approximately 240 grams of dichlorodimethyl hydantoin and 124 grams of potassium iodide were added to the circulating water two times a week. This addition provided a molar ratio of available chlorine to available iodine of 6:1 and a total iodine concentration of 13 parts per million. Replacement water pH was approximately 7.6.

Excellent results were noticed in the first few days as long strips of scale were found to have been stripped from metallic surfaces. In addition, auxiliary cooling units which had been required with the prior descaling process (a muriatic acid process), were no longer needed.

At the conclusion of the test period, portions of the water pipes were examined. The amount of scale remaining in these pipes was of negligible thickness. The pH of the circulating water was found to have risen to 8.6 indicating an increase in scale-producing salts in the circulating water. The water was a dark green color of moderate clarity.

Since various changes may be made in the materials and procedure of the process described herein, I do not intend that my invention be limited by the particular materials and procedure described herein, but that my invention be limited only by the scope of the appended claims.

I claim:

1. A process for reducing the amount of scale of deposition in a water system, said process comprising: adding to said water system a water-soluble iodide to maintain a total concentration of iodide in excess of 5 parts per million and also adding to said water system a chloride-yielding substance to maintain a molar ratio of chlorine to iodine in excess of 9:1.

2. A process for continuously reducing the amount of scale deposition in an evaporative cooling system, said process comprising: periodically adding to said evaporative cooling system a water-soluble iodide to provide a total concentration of iodide in excess of 5 parts per million, and also periodically adding to said evaporative cooling system a chloride-yielding substance to provide a molar ratio of chlorine to iodine in excess of 9:1.

3. A process for reducing the amount of scale deposition in an evaporative cooling system, said process comprising: adding to said evaporative cooling system a water-soluble iodide to provide an initial concentration of iodide of approximately 10 parts per million and also adding to said evaporative cooling system a chloride-yielding substance to provide an initial molar ratio of chlorine to iodine of approximately 12:1.

4. A process for retarding scale deposition in a water system and for removing scale therein, said process comprising: adding to said water system periodically a water-soluble iodide to provide a total concentration of iodide in excess of 5 parts per million; and further, periodically, adding to said water system a chloride-yielding substance to provide an initial molar ratio of chlorine to iodine in excess of 6:1, whereby to retard said scale deposition and to remove said scale.

References Cited by the Examiner

UNITED STATES PATENTS

| | | | |
|---|---|---|---|
| 2,443,429 | 6/1948 | Marks et al. | 210—62 |
| 3,136,716 | 6/1964 | Kitter | 210—62 |
| 3,189,518 | 6/1965 | Glasgow | 167—17 |

OTHER REFERENCES

Betz: Handbook of Industrial Water Conditioning, fifth edition, 1958, Betz Laboratories, Inc., Philadelphia 24, Pa., pp. 159, 160 and 178–181 particularly relied on.

MORRIS O. WOLK, *Primary Examiner.*

MICHAEL E. ROGERS, *Examiner.*